Jan. 10, 1933.  C. H. HAVILL  1,893,861
PROPELLER
Filed May 29, 1931
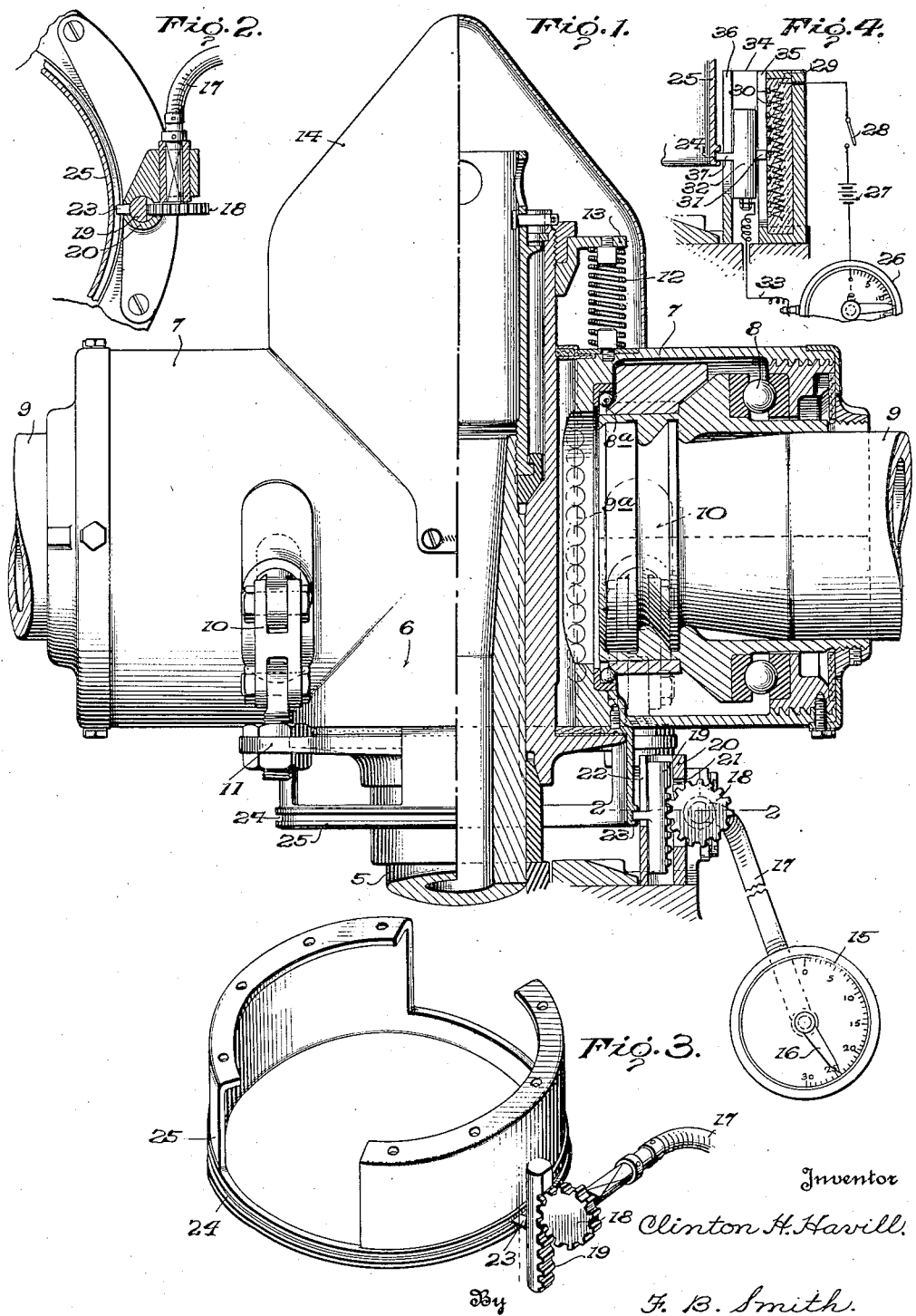

Patented Jan. 10, 1933

1,893,861

UNITED STATES PATENT OFFICE

CLINTON H. HAVILL, OF SOUTH ORANGE, NEW JERSEY, ASSIGNOR TO BENDIX RESEARCH CORPORATION, OF EAST ORANGE, NEW JERSEY, A CORPORATION OF INDIANA

PROPELLER

Application filed May 29, 1931. Serial No. 541,035.

This invention relates to propellers and more particularly to propellers in which the pitch of the blades is automatically varied during operation and in which means are provided for continuously indicating the pitch of the blades.

One of the objects of the present invention is to provide a novel propeller having means for changing the pitch of the blades during operation together with novel means for indicating the pitch of the blades.

Another object of the present invention is to provide novel means for continuously indicating the pitch of the blades of a variable pitch propeller.

Another object is to provide novel means for connecting an indicating device to a variable pitch propeller for actuation in response to movement of the pitch changing mechanism.

A further object is to provide novel means for connecting an indicating device to a propeller in which the hub is slidable axially of the driving shaft in response to the thrust of the blades to vary the pitch of the latter.

A still further object is to provide a novel means for indicating the pitch of the blades of a variable pitch propeller which is compact in form and positive and reliable in operation and which is particularly adapted for use in aircraft.

Further objects and novel features of the invention will appear more fully hereinafter from the following detailed description when taken in connection with the accompanying drawing. It is to be expressly understood, however, that the drawing is for the purposes of illustration only, and is not designed as a definition of the limits of the invention, reference being had to the appended claims for this purpose.

In the drawing, wherein like reference characters indicate like parts throughout the several views:

Fig. 1 is a view partly in section and partly in elevation of a propeller embodying the principles of the present invention;

Fig. 2 is a section on line 2—2 of Fig. 1;

Fig. 3 is a perspective view of certain of the parts shown in Fig. 1; and

Fig. 4 is a partial section showing a modified arrangement for connecting the indicating device and pitch varying mechanism.

Referring to the drawing, and more particularly to Fig. 1 thereof, a propeller embodying the principles of the present invention is illustrated therein as being constituted by a rotatable engine shaft 5, or extension thereof, and a hub 6 having a plurality of sockets 7 containing suitable bearings 8 and 8a for rotatably mounting the inner or root ends of propeller blades 9 in any suitable manner, the hub being drivably connected with the shaft and movable axially with respect thereto in response to the thrust of the blades, a plurality of rows of bearings, one of which is indicated at 9a being interposed between the shaft and hub in order to permit such movement of the hub in a substantially frictionless manner.

Means are provided for rotating each blade in its respective socket for varying the pitch thereof during movement of the hub axially of the shaft, such means as shown being constituted by link mechanisms 10, there being one such link for each blade. One end of each link 10 is operatively connected to the root end of each blade 9 and the other ends of the links are fastened to a plate member 11 which is rigidly secured to the driving shaft 5 in any suitable manner and which is preferably disposed rearwardly of the hub 6. From this construction, it will be apparent that during forward thrust-responsive movement of the hub relative to the shaft and plate member, each blade will be rotated in its respective socket to vary the pitch thereof, it being pointed out that when the parts are in the position shown in Fig. 1 the pitch of the blades is a maximum, the pitch being gradually reduced during forward movement of the hub.

Means are provided to yieldingly oppose forward movements of the hub with respect to the shaft and to arrest such movement at certain positions along the shaft in accordance with the degree of thrust exerted by the blades under varying conditions of operation. As shown, such means are constituted by a plurality of resilient members, such as for example, coil springs 12, arranged concentrically around the shaft 5 and interposed between the hub 6 and a plate 13 secured in any suitable manner to the shaft. A housing or nosepiece 14 of suitable shape encloses the springs 12 and serves to increase the aerodynamical efficiency of these parts as well as to protect the interior of the hub from rain, snow, etc.

In order to indicate the pitch of the blades at any given time to the operator of a vehicle equipped with a propeller such as the one described above, means are provided in connection with the pitch changing mechanism for registering the angularity of the blades. As shown in Figs. 1 to 3, these means are constituted by a graduated dial 15 having a pointer 16 mounted thereon for rotation about the center thereof and a flexible connection 17, such as a Bowden wire, for connecting the pointer to a suitable actuating mechanism. It is to be understood that the dial 15 may be mounted in any convenient place, such for example as the instrument board or dash of the vehicle. The flexible connection 17 is attached at its other end to a pinion 18 which is mounted in suitable bearings on the vehicle frame and which meshes with an axially movable gear member or rack 19. A guiding sleeve 20 is provided for the rack having a slot 21 in one side thereof through which the pinion 18 extends and a slot 22 in the other side thereof through which a pin or finger 23 integral with or rigidly attached to the rack extends. The finger 23 slidably engages a groove 24 in a sleeve 25 which is attached to the hub 6 for rotative and axial movement therewith. When the hub moves axially of the shaft in response to the thrust of the blades, the rack 19 will also be moved axially an equal amount due to engagement of the finger 23 in the groove 24 thus causing rotation of the pinion 18, flexible connection 17 and pointer 16 to indicate on the dial 15 the pitch of the blades, as will be readily apparent from an inspection of Fig. 1.

Referring to Fig. 4 there is shown therein a modified form of the invention in which electrical means are employed for indicating the pitch of the blades. In this form an electrical indicating device 26 is mounted in any convenient place, such as the instrument board of the vehicle, and is connected through a battery 27 and a switch 28 with a suitable resistance 29 having a series of tap-offs 30 exposed on one side thereof. A contact member 31 mounted on an elongated sliding member 32 successively engages the tap-offs 30 to increase or decrease the resistance in the circuit and the member 32 is connected to the indicator 26 by a conductor 33 to complete the circuit. The member 32 slides in a guiding sleeve 34 having a slot 35 in one side thereof through which the contact 31 extends and a slot 36 in the opposite side thereof through which a finger 37 extends to engage the groove 24 in sleeve 25. In the operation of this form, the member 32 is moved in the guiding sleeve 34 in response to axial thrust-responsive movement of the hub by pin 37 and sleeve 25, thus causing the contact 31 to slide along the series of tap-offs 30 to vary the resistance in the indicator circuit. It will be apparent that the variation in resistance is directly proportioned to the position of the hub and hence the pitch of the blades, so that fluctuations in the indicator 26 due to change of resistance in the circuit can be calibrated in accordance with the pitch of the blades.

There is thus provided by the present invention a novel variable pitch propeller of the type wherein variation of the pitch of the blades is effected by automatic longitudinal movement of the hub relative to the propeller shaft and embodying novel means for indicating the pitch of the blades during operation, which means is constructed of a minimum number of parts thus resulting in a structure which is unusually simple and efficient in operation and of a rugged and compact construction. It will be appreciated that in both the modifications described above, since the pitch-indicating mechanism is directly movable in response to thrust-responsive movement of the hub relative to the propeller shaft, the said mechanism would not only serve to indicate the pitch of the blades, but would also serve to give an indication to the pilot of the thrust exerted by the propeller under various conditions.

Though only two embodiments of the present invention are shown and described herein, it is to be understood that the same is not limited thereto but may be embodied in various mechanical forms as will appear to those skilled in the art without departing from the scope of the invention as defined in the appended claims.

What is claimed is:

1. A variable pitch propeller comprising a plurality of blades, means responsive to the thrust of said blades for varying the pitch thereof, and other means responsive to the thrust of said blades for indicating the pitch thereof.

2. A variable pitch propeller comprising a plurality of blades, means movable in response to the thrust of the blades for varying the pitch thereof, and other means responsive to movement of said first named means for indicating the pitch of the blades.

3. A variable pitch propeller comprising a plurality of blades, means movable in response to the thrust of said blades for changing the pitch thereof, a device separate from said means for indicating the pitch of said blades, and means cooperating with said movable means for actuating said indicating device.

4. A variable pitch propeller comprising a shaft, a plurality of propeller blades, a hub carrying said blades and movable axially of the shaft, means responsive to axial movement of the hub for changing the pitch of the blades, and other means responsive to axial movement of the hub for indicating the pitch of the blades.

5. A variable pitch propeller comprising a shaft, a hub movable axially of said shaft, a plurality of blades mounted on said hub, means responsive to movement of said hub for changing the pitch of said blades, other means for indicating the pitch of said blades, and means for actuating said indicating means comprising a member movable with said hub and a second member cooperating with said movable member and operatively connected to said indicating means.

6. A variable pitch propeller comprising a shaft, a hub movable axially of said shaft, a plurality of blades carried by said hub, said hub being movable in response to the thrust of said blades, means interconnecting said hub and blades for changing the pitch of the blades in response to the thrust-responsive movement of the hub, separate means for indicating the pitch of the blades, and means for actuating said indicating means in response to thrust-responsive movement of said hub.

7. A variable pitch propeller comprising a shaft, a hub movable axially of said shaft, a plurality of blades carried by said hub, said hub being movable in response to the thrust of the blades, means responsive to movement of the hub for changing the pitch of the blades, separate means for indicating the pitch of the blades, a gear member movable with said hub, a second gear member cooperating with said first gear member, and means operatively connecting said second gear member with said indicating means.

8. A variable pitch propeller comprising a shaft, a hub movable axially of said shaft, a plurality of blades carried by said hub, said hub being movable in response to the thrust of the blades, means responsive to movement of the hub for changing the pitch of the blades, and separate means for indicating the pitch of the blades, said means including a rack movable with said hub, a pinion cooperating with said rack for rotation thereby upon movement of said hub, an indicator, and a flexible connection between said pinion and said indicator.

9. A variable pitch propeller comprising a shaft, a hub movable axially of said shaft, a plurality of blades carried by said hub, said hub being movable in response to the thrust of the blades, means responsive to movement of the hub for changing the pitch of the blades, means for indicating the pitch of the blades, and electrically responsive means connecting said indicating means and said hub for actuating the indicating means.

10. A variable pitch propeller comprising a shaft, a hub movable axially of the shaft, a plurality of blades carried by said hub, said hub being movable in response to the thrust of the blades, means responsive to movement of the hub for changing the pitch of the blades, means for indicating the pitch of the blades, an electric contact member movable with said hub, a stationary contact member cooperating with said movable contact member, and connections between said contact members and said indicating means whereby said indicating means will be actuated in accordance with movement of said hub.

11. In a variable pitch propeller having a plurality of blades, a rotatable shaft, a hub rotatable with said shaft and movable axially thereof to change the pitch of said blades, separate means for indicating the pitch of said blades, means for connecting said hub and said indicating means comprising a member carried by said hub and rotatable therewith, and means associated with said member and connected to said indicating means for actuating said indicating means in response to movement of the hub.

12. In a variable pitch propeller having a plurality of blades, a rotatable shaft, a hub rotatable with said shaft and movable axially thereof to vary the pitch of the blades, and means for indicating the pitch of said blades, said means including means for connecting said hub and indicating means comprising, a sleeve having a peripheral groove therein and carried by said hub, a member mounted for movement axially of said shaft and having a portion extending into said groove, an indicator, and means connecting said member and said indicator.

13. In a variable pitch propeller having a plurality of blades, a rotatable shaft, a hub rotatable with said shaft and movable axially thereof to vary the pitch of the blades, means for indicating the pitch of said blades, and means for connecting said hub and indicating means comprising a sleeve having a peripheral groove therein and carried by said hub, a rack member mounted for movement axially of said shaft and having a portion extending into said groove, a pinion meshing with said rack member, and means connecting said pinion and said indicating means.

14. In a variable pitch propeller having a rotatable shaft, a hub rotatable therewith and movable axially thereof, a plurality of blades and means for indicating the pitch of the blades, means for connecting said hub and blades comprising a sleeve having a peripheral groove therein and carried by said hub, a member mounted for movement axially of said shaft and having a portion extending into said groove, an electric contact carried by said member, a stationary member having a series of electric contacts adapted for successive engagement with said first named contact, and connections between said contacts and said indicating means.

15. A variable pitch propeller comprising a shaft, a plurality of blades, a hub mounted on said shaft and rotatably carrying said blades, said hub being movable axially of said shaft in response to the thrust of said blades, means actuated by the thrust-responsive movement of said hub for varying the pitch of the blades, and other means actuated by such thrust-responsive movement of the hub for indicating the extent of such movement in order to indicate the thrust and pitch of the blades.

In testimony whereof I have signed this specification.

CLINTON H. HAVILL.